Patented Aug. 10, 1948

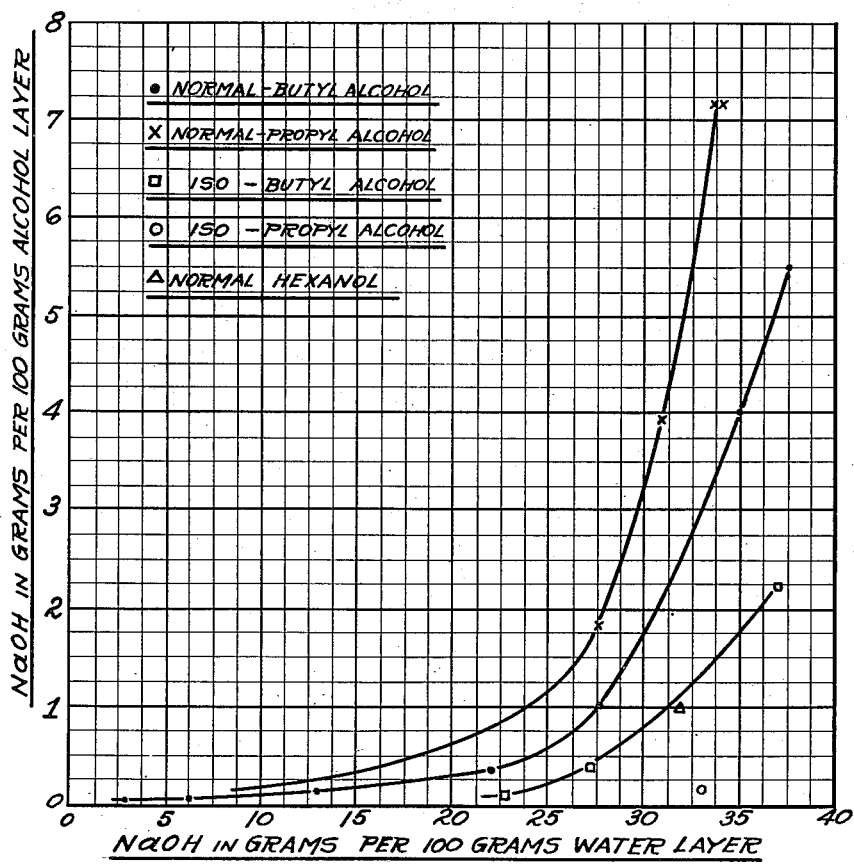

2,446,868

UNITED STATES PATENT OFFICE 2,446,868

PROCESS FOR PURIFYING AQUEOUS ALKALI METAL HYDROXIDES

George Lewis Cunningham, Painesville, Ohio, assignor to Diamond Alkali Company, Pittsburgh, Pa., a corporation of Delaware Application September 25, 1943, Serial No. 503,826

13 Claims. (Cl. 23—184)

This invention relates generally to the art of purifying alkali metal hydroxides and is particularly concerned with a new and improved method of purifying aqueous solutions of such materials.

While the process of the invention has application to the purification of alkali metal hydroxides generally, as for example, potassium hydroxide, it will be described for convenience in its application to the purification of sodium hydroxide, customarily known as caustic soda. This widely used material of commerce is generally produced by one of two processes, namely the chemical process which produces a comparatively pure product, or the electrolytic process, in which case the caustic soda contains substantial amounts of impurities, notably sodium chloride. In recent years the demand for purer grades of caustic soda has progressively and insistently increased, and the necessity has arisen for purifying as cheaply as possible large quantities of caustic soda, especially that produced by the electrolytic method.

Numerous processes have been proposed to satisfy this demand but only a few were feasible commercially and they possessed disadvantages, which were serious but were tolerated because no means of avoiding them was known.

In the present state of the art there are two principal methods in commercial use for the purification of caustic soda. In one, it is crystallized from aqueous solution and then obtained in a high state of purity. But the process is cumbersome and expensive, and leaves as residue a large proportion of the original caustic soda in an impure state having small commercial value. In the other, aqueous caustic soda is treated with liquid ammonia which serves as a solvent for common caustic soda impurities and which removes selectively from the caustic soda solution a large portion of its impurities, notably salt. This process possesses the disadvantages that the aqueous sodium hydroxide must be treated a number of times with fresh, concentrated ammonia solutions, and that special apparatus must be used because ammonia vapor, which is liberated, must be confined; the resulting pressures considerably exceed one atmosphere. Furthermore, the use of ammonia as a solvent under conditions of high temperature and pressure make it expensive and hazardous.

By the present invention even the impurities present in electrolytic caustic soda, such as chlorine-containing compounds, silica, alumina and hydroxides of iron, may be separated from the caustic soda without the use of special or high pressure-resisting apparatus, and without the use of strong ammonia solutions. Moreover, the solvents used may be readily reclaimed and used repeatedly and there is no substantial loss of caustic soda or solvent.

I have discovered that certain organic liquids which are substantially non-miscible with water have the property of dissolving or otherwise extracting caustic soda selectively from its aqueous solution, without at the same time dissolving or extracting much if any of the undesirable impurities contained therein. Organic substances which have this property, and which are operative in the process of the invention at substantially atmospheric temperature and pressure, comprise alcohols containing more than two carbon atoms, i. e., propyl, butyl and amyl alcohols. In general, the lower the molecular weight the greater is the affinity of an alcohol for caustic soda and for that reason alcohols higher in the series than amyl are not well suited to my process, though it may be possible in theory to use them. On the other hand, methyl and ethyl alcohol have a high extractive power for caustic soda, but unfortunately they are miscible in all proportions with water and therefore do not effect the desired separation. Generally, the simpler isomers exhibit a greater affinity for caustic soda than the more complex isomers and, therefore, in practicing the present invention I prefer to use the normal or iso form of alcohol over the secondary or tertiary form.

Thus it is possible to separate caustic soda from its impurities by treating it in aqueous solution together with its impurities with an alcohol which is substantially immiscible with water in the presence of caustic soda and which has an affinity for caustic soda, and separating the alcohol from the aqueous solution. By taking advantage of this discovery much of such a hydroxide may be separated and removed from the impurities, in contrast with prior processes in which attempts were made to separate and remove the impurities from the hydroxide.

I have further discovered that, having extracted relatively pure caustic soda from its impure solution in the manner described, it is possible to recover it cheaply and effectively by bringing the alcoholic extract into intimate contact with water, whereupon a major portion of the caustic soda contained in the alcoholic extract passes into the water to form a purified aqueous caustic solution.

While either extraction step may be carried out batchwise with reasonably satisfactory results, I have found it advantageous to carry out one or both by effecting countercurrent contact between the two liquid phases by well known methods which need not therefore be described in detail.

I have further found by actual experiment and trial that the removal of caustic from the alcohol extract by contact with water is under proper conditions so nearly complete that the residual alcohol is an effective solvent for use in the first extraction step.

Briefly stated, the present invention involves the steps of treating an aqueous solution of an alkali metal hydroxide with an excess of a liquid which is immiscible therewith, thereby causing much of the hydroxide to associate itself with that liquid, removing that liquid and its hydroxide, and treating the thus separated material with an excess of water, thereby causing much of the hydroxide to become associated with the water and freeing the said liquid for reuse with another quantity of impure aqueous hydroxide.

The percentages mentioned in this specification and in the following claims are in every case calculated upon a weight rather than a volume basis.

Throughout this specification and the appended claims the temperature of the alcohol, water and aqueous solutions of caustic soda is about 20° C. unless otherwise stated.

The figure accompanying and forming a part of this specification is a chart which indicates the distribution ratio of caustic soda in an alcohol-water system at atmospheric pressure and a temperature of about 20° C. Each of the three curves and two points appearing on said chart represents the distribution of caustic soda in systems of water and the specified alcohol identified on the chart.

The curve of the water-normal butyl alcohol system shows that the amounts of caustic soda which are associated with the water and with the alcohol vary widely depending on the amount of caustic soda present. For example, when there are about 28½ grams of sodium hydroxide present in the system, 27½ grams are associated with the water and only 1 gram is associated with the alcohol. Also, as the quantity of caustic soda in said system is increased above about 28½ grams, the excess is distributed in roughly a two to one ratio between the components of the system, two parts becoming associated with the water while one part becomes associated with the alcohol. For instance, when the caustic soda present is increased by about 14½ grams, making a total of about 43 grams of caustic soda in the system, about 10 grams thereof are associated with the water and about 4½ grams are associated with the alcohol. As the quantity of caustic soda in the system is increased from zero to about 22.4 grams per 100 grams of alcohol and per 100 grams of water, roughly 55 parts of caustic soda become associated with the water for every part of caustic soda becoming associated with the alcohol. By operating on different parts of the curve caustic soda may be removed from the water or from the alcohol. For example, if it is desired to separate caustic soda from its impurities, a strong impure aqueous caustic soda solution may be treated with the alcohol containing little or no caustic soda whereupon much of the caustic soda associates itself with the alcohol and together therewith may be separated from the water and impurities. Or, if it is desired to separate caustic soda from the alcohol, water containing little or no caustic soda may be added thereto, whereupon most of the caustic soda in the alcohol associates itself with the water and the alcohol may be separated therefrom.

In other words, by varying concentrations the caustic soda may be shifted from the water to the alcohol or vice versa.

In general the foregoing description of the water-normal butyl alcohol system applies to the other systems depicted on the chart and, accordingly, a detailed description of each of those systems is believed to be unnecessary.

There are a number of alcoholic substances which can be used in carrying out this invention, among which are normal and iso-propyl alcohol, normal and iso-butyl alcohol, normal and iso-amyl alcohol, and secondary amyl alcohol. Methyl and ethyl alcohol, being soluble in all proportions in aqueous alkali metal hydroxide solutions, do not form two liquid layers and, hence, are of little or no value. Generally, alcohols of higher molecular weight will become associated with relatively little alkali metal hydroxide and are, therefore, of little practical importance in the present process. It is to be understood, however, that such alcohols can be used in this process but that their use necessitates the circulation of an excessive quantity of alcohol for any given quantity of purified alkali metal hydroxide. By mixing alcohols it is sometimes possible to employ those which are otherwise not useable. For example, I have found that by mixing normal butyl alcohol with methanol or ethanol efficient extraction can be made because of the relatively great affinity of methanol or ethanol for alkali metal hydroxide and the insolubility of the butanol in said hydroxide.

In general the tertiary alcohols such as tertiary butyl alcohol, tertiary amyl alcohol, phenol, cresol and the like function so inefficiently in this process that they would not ordinarily be used. Tertiary alcohols mixed with one or two of the primary or secondary class may be used, if desired, but are not preferred.

In the commercial practice of this invention I prefer first to concentrate the raw, aqueous, caustic soda solution in order to remove the bulk of its sodium chloride content by the cheapest possible means, by usual evaporation technique until it contains about 50% of anhydrous sodium hydroxide.

After the caustic solution has been sufficiently concentrated, cooled and filtered to remove the precipitated sodium chloride and other solid impurities it may be diluted with water to a strength of about 35% to 37% of caustic soda. Normal butanol may then be brought into contact with it and the mixture mechanically agitated for about 3 to 5 minutes. The volume of alcohol introduced may be less than, equal to, or greater than, that of the impure aqueous sodium hydroxide; but, preferably, it is about five times the volume of said aqueous material. The alcohol layer which forms on the surface of the aqueous solution after agitation has been stopped is removed from the solution in any convenient manner, for example, by decantation or by means of a syphon. This step should be performed with particular care to insure that none of the aqueous solution is carried away with the alcohol, since the impurities are concentrated therein.

Ordinarily, the alcohol-water-caustic soda system comes to equilibrium so rapidly that the length of time of contact of the alcohol and aqueous caustic soda may be limited to but a few seconds. Failure of the system to reach equilibrium before the alcohol and the caustic soda associated therewith is separated from the aqueous caustic soda will be reflected in a decrease in yield of purified caustic soda. By extending the period of contact of the alcohol and aqueous caustic soda, this yield can be increased; but efficiency of the process is not thereby improved. Failure of the system to reach equilibrium rapidly may be due to a low concentration of caustic soda, or it may be due to a relatively low affinity of the alcohol for caustic soda, or it may be due to a combination of these and other factors.

Next, the alcohol containing extracted alkali metal hydroxide may be contacted with a quantity of pure water, preferably below the surface thereof. The quantity of water can be any convenient quantity, however, it is preferable that it should be present in quantity greater than that of the alcohol, the upper limit being dictated by the economics of the process. After the mixture has been thoroughly mixed and settled, and the alcohol has been separated and removed from the aqueous fraction in a manner similar to that described hereinbefore, the alcohol, which now contains substantially no sodium hydroxide, is reintroduced into another quantity of impure, aqueous caustic soda.

The effectiveness of the process of the present invention, when operated batchwise and countercurrent, is indicated by the following illustrative, but not limiting example:

*Example*

A solution of impure sodium hydroxide containing 35 per cent sodium hydroxide and the following impurities on an anhydrous basis: 1.99% NaCl, .034% $SiO_2$, .038% $Al_2O_3$, .003% Fe, .006% Ca, .003% Mg, .021% $SO_4$ and .72% $ClO_3$, was passed downward through a tower countercurrent to an upward stream of normal butyl alcohol at 20° C. The sodium hydroxide solution issuing from the bottom of the tower contained 24.2% sodium hydroxide and the following per cent impurities on an anhydrous basis: 2.59% NaCl, .047% $SiO_2$, .041% $Al_2O_3$, .005% Fe, .006% Ca, .003% Mg, .027% $SO_4$ and .182% $ClO_3$. The normal butyl alcohol, containing approximately 7% sodium hydroxide, was passed upward through a tower countercurrent to a descending stream of water at 20° C. Normal butyl alcohol practically free of sodium hydroxide taken from the top of the tower was used again in the first tower to repeat the cycle. The purified sodium hydroxide solution removed from the bottom of the second tower contained 19.5% sodium hydroxide and the following impurities on an anhydrous basis: .098% NaCl, .014% $SiO_2$, .012% $Al_2O_3$, .002% Fe, .002% Ca, .002% Mg, .006% $SO_4$ and .042% $ClO_3$.

In the practice of the present invention as a continuous process, which, incidentally, is the method recommended for easy and efficient commercial operation, I modify the hereinbefore described batch process by merely providing and using means for continuously feeding the raw materials and withdrawing the products.

The continuous process, as I prefer to operate it, involves concentrating the hydroxide as described in connection with the batch process, cooling and filtering off the insolubles, and diluting the solution with water to such an extent that solid phase is not formed to an objectionable extent, if at all. Then alcohol is brought into the caustic soda solution through a suitable opening near the bottom of the vessel containing the solution. The alcohol, being lighter than the hydroxide solution, rises to the surface and as it collects there, it is removed carefully to avoid drawing off any of the aqueous fraction and then it is brought into contact with pure water by passing it into a suitable opening near the bottom of the vessel containing said water. The alcohol rises to the surface where it is collected and drawn off and reintroduced into the impure caustic soda solution. The system is so arranged that after the first portion of alcohol has made the complete circuit, there is alcohol in all parts of the system at all times.

Concentration of caustic soda in the impure solution is maintained constant within about 2% of caustic soda, usually at a strength of about 36% of caustic soda, by bringing into the solution fresh 50% sodium hydroxide concentrated as hereinbefore described, and by removing at a corresponding rate the most spent portion of said solution. The rate of flow of the fresh hydroxide into the system and the rate of flow of the spent portion of the solution from the system are adjusted according to the concentration of the caustic soda solution; but in commercial operation the process is readily standardized so that rates of flow into and out of the solution can be adjusted and maintained constant over long periods.

Similarly, the rate of flow of pure water into the purified hydroxide solution is regulated with respect to the rate of flow out of solution of water containing about 20% of caustic soda. Thus, the average concentration of hydroxide in this purified solution is maintained nearly constant.

I have found that the continuous process may be operated most advantageously on the countercurrent principle. That is, the alcohol is passed in contact with the impure aqueous caustic soda solution in such a manner that it enters and leaves said solution where the concentration of caustic soda is the least and the greatest, respectively, and, conversely, the alcohol is passed in contact with the purified aqueous caustic soda solution in such a manner that it enters and leaves said solution where the concentration of caustic soda is the greatest and the least, respectively.

Any of the numerous practical mechanical means developed in connection with previous work on countercurrent processes using immiscible liquids are suitable for use in the instant process.

Dilute, impure, caustic soda liquor withdrawn from the system may be used for purposes not requiring premium grade material, or the solution may be evaporated until it is approximately 50% caustic soda, then cooled and filtered to remove excess sodium chloride and other solid impurities, and retreated by the alcohol extraction process.

It is to be understood that although the process of the present invention has been described only with reference to operation at about 20° C. without artificial pressure, conditions of temperature and pressure can be varied and certain advantages can be realized thereby. The solubility of caustic soda in water and in alcohol varies as the temperature, and therefore, each increase in temperature of the solutions composing the system is accompanied by an increase in the yield of purified sodium hydroxide, other things remaining constant. There is, however, a limit beyond which the temperature cannot be carried without considerable evaporation loss of alcohol due to its volatility, and without a considerable increase in contamination of the purified product because of the increased solubility of impurities in the caustic soda extracting medium. The toxic nature of the vapors of some alcohols and the cost of alcohols in general necessitates the employment of special, gas-tight equipment for commercial operation at elevated temperatures.

No advantage is seen in operating below about 20° C.; but the process is operable so long as the caustic soda solutions in said process are maintained in the liquid phase.

Throughout this specification and in the appended claims, wherever mention is made of the range of concentration of impure aqueous caustic soda to be processed, the upper limit of concentration is set at about 37% by weight of caustic soda. What is meant is that the concentration of caustic soda in the water solution be not greater than about 37% after the caustic soda-extracting alcohol, as for example, normal butyl alcohol, has been contacted with said solution. If the water solution contains in excess of about 37% caustic soda following the addition of normal butanol, a solid phase will form and gather at the alcohol-water interface. Through careful operation of the present process in a batchwise manner, it is possible to prevent this solid material from following the alcohol upon separating said alcohol from the impure aqueous caustic soda. In operating the process in a continuous manner, however, it is practically impossible without filtration means, or the equivalent, to prevent some of the solid from carrying over with the separated alcohol and coming into contact with the aqueous solution of purified caustic soda and releasing some of the impurities associated with it to contaminate said solution. While the apparatus for carrying out the present invention in a continuous manner may be equipped with a filter to guard against any solid "carry-over" to the solution of purified caustic soda, care should be exercised to avoid the formation of a solid phase which will collect in the filter to interfere with the flow of alcohol and effect a reduction in the efficiency of the process.

The limit of concentration of the caustic soda solution when normal propyl alcohol or iso butyl alcohol is employed to effect caustic soda extraction can be read from the accompanying chart hereinbefore described. As with the normal butyl alcohol, the point at the upper end of each curve on said chart indicates the end of the single phase system. An increase in the amount of caustic soda in the system as represented by the upper end point of each curve will result in the formation of a solid phase.

The lower economic limit of concentration of the impure caustic soda solution, as specified herein, is probably about 25%. It is possible, of course, to operate the process of the present invention using a 20%, a 10%, or even a 5% solution of caustic soda, but since the solution of purified caustic soda is necessarily of less strength than the solution of impure caustic soda, such a procedure is not preferred. I have found the process to be less feasible economically if normal butanol is used and if the purified caustic soda is not recovered as an aqueous solution of at least about 20% strength. It is desirable, therefore, that the strength of the solution of impure caustic soda be maintained above about 20%, and preferably substantially thereabove.

For many purposes the purified caustic soda, as it is withdrawn during the continuous process or collected at the end of the batch process, is sufficiently concentrated. If a higher concentration is desired, however, the solution may be evaporated in equipment of known types to avoid contamination.

While this specification has been devoted entirely to describing how caustic soda may be treated and purified according to this invention, the process is equally applicable to the other alkali metal hydroxides.

Having thus described the present invention so that others skilled in the art may be able to understand and practice the same, I state that what I desire to secure by Letters Patent is defined in what is claimed.

What is claimed is:

1. The method of purifying alkali metal hydroxide which comprises the steps of treating an impure aqueous solution of said hydroxide with an alcohol selected from the group consisting of n-propyl, iso-propyl, n-butyl, iso-butyl, n-amyl, iso-amyl and secondary amyl and mixtures thereof, separating and removing the alcohol and hydroxide associated therewith, contacting said alcohol with water substantially free of contaminants other than purified hydroxide of the character undergoing treatment, and separating and removing the water and hydroxide associated therewith from the alcohol.

2. The method of purifying alkali metal hydroxides which comprises the steps of treating an impure aqueous solution of such hydroxide with a solvent selected from the group consisting of n-propyl, isopropyl, n-butyl, isobutyl, n-amyl, isoamyl, secondary amyl alcohol, and mixtures thereof, separating and removing the solvent and hydroxide associated therewith from the resulting mixture, and separating and recovering the alkali metal hydroxide from the solvent.

3. The method of purifying alkali metal hydroxides which includes the steps of treating an impure aqueous solution of such hydroxide with a mixture of an immiscible solvent selected from the group consisting of n-propyl, isopropyl, n-butyl, isobutyl, n-amyl, isoamyl, secondary amyl alcohol, and mixtures thereof, and immiscible solvents selected from the group consisting of methyl and ethyl alcohols, separating and removing the solvent and hydroxides associated therewith from the resulting mixture, and separating and recovering the alkali metal hydroxides from the solvent.

4. The method according to claim 2 wherein the hydroxide and the alcohol are caused to move countercurrent to and in contact with each other.

5. The method according to claim 2 wherein the water and the alcohol are caused to move countercurrent to and in contact with each other.

6. The method according to claim 2 wherein the hydroxide and the alcohol are caused to move countercurrent to and in contact with each other, and the water and the alcohol are caused to move countercurrent to and in contact with each other.

7. Process according to claim 2, wherein alcohol which is separated and removed from the resulting aqueous solution of alkali metal hydroxide is recycled through the process.

8. The method of purifying caustic soda which comprises the steps of mixing a water solution containing between about 25% and about 37% thereof with normal butanol, separating and removing the normal butanol, mixing the alcohol with water containing less than about 20% of purified caustic soda and substantially no other contaminant, and separating and removing the normal butanol from the aqueous purified sodium hydroxide.

9. The method of purifying caustic soda which comprises the steps of causing a solution containing between about 25% and about 37% thereof to move and causing liquid normal butanol to move in contact therewith but counter to the direction of movement thereof, separating and removing the normal butanol from the water solution, contacting the normal butanol with water containing less than about 20% of purified caustic soda and substantially no other contaminant, and separating and removing the normal butanol from the aqueous purified sodium hydroxide.

10. The method of purifying caustic soda which comprises the steps of contacting a water solution containing between about 25% and about 37% thereof with normal butanol, separating and removing the normal butanol from the water solution, causing water containing less than about 20% of purified caustic soda and substantially no other contaminant to move and causing normal butanol to move in contact therewith but counter to the direction of movement thereof, and separating and removing the alcohol from the aqueous purified sodium hydroxide.

11. The method of purifying caustic soda which comprises the steps of causing a solution containing between about 25% and about 37% thereof to move and causing liquid normal butanol to move in contact therewith but counter to direction of movement thereof, separating and removing the normal butanol from the water solution, causing water containing less than about 20% of purified caustic soda and substantially no other contaminant to move and causing normal butanol to move in contact therewith but counter to the direction of movement thereof, and separating and removing the alcohol from the aqueous purified sodium hydroxide.

12. Method according to claim 11 wherein the separation and removal of normal butanol from the impure aqueous caustic soda is made after the alcohol has dissolved the equivalent of not less than about 3% of its weight of caustic soda, and wherein the separation and removal of sodium normal butanol from aqueous, purified sodium hydroxide is made after at least about 90% of the caustic soda contained in the alcohol before it was contacted with said purified solution is removed therefrom.

13. The method of purifying caustic soda which comprises the steps of mixing a water solution containing between about 25% and about 37% thereof with normal propanol, separating and removing the normal propanol, mixing the alcohol with water containing less than about 20% of purified caustic soda and substantially no other contaminant, and separating and removing the normal butanol from the aqueous purified sodium hydroxide.

GEORGE LEWIS CUNNINGHAM.

REFERENCES CITED

The following references are of record in the file of this patent:

UNITED STATES PATENTS

| Number | Name | Date |
|---|---|---|
| 1,202,081 | McAfee | Oct. 24, 1916 |
| 1,453,206 | Mann | Apr. 17, 1923 |
| 1,712,830 | Kyrides | May 14, 1929 |
| 1,968,544 | Vana | July 31, 1934 |
| 2,022,274 | Brooks | Nov. 26, 1935 |
| 2,075,179 | Cunningham | Mar. 30, 1937 |
| 2,127,496 | Waldeck | Aug. 23, 1938 |

FOREIGN PATENTS

| Number | Country | Date |
|---|---|---|
| 255,880 | Great Britain | July 21, 1926 |

OTHER REFERENCES

Holleman et al.: "Textbook of Organic Chemistry," Wiley and Sons, N. Y., 1st edition (1903) page 66.

"International Critical Tables," vol. III, page 422.